United States Patent
Bannister et al.

(10) Patent No.: US 7,306,761 B2
(45) Date of Patent: Dec. 11, 2007

(54) METHOD OF MANUFACTURING COMPOSITE SANDWICH STRUCTURES

(75) Inventors: Michael Keith Bannister, Balwyn (AU); Rowan Johnson Paton, Brighton (AU)

(73) Assignee: Advanced Composite Structures Ltd, Fishermens Bend, Victoria (AU)

( * ) Notice: Subject to any disclaimer, the term of this patent is extended or adjusted under 35 U.S.C. 154(b) by 427 days.

(21) Appl. No.: 10/492,115

(22) PCT Filed: Oct. 11, 2002

(86) PCT No.: PCT/AU02/01383

§ 371 (c)(1),
(2), (4) Date: Dec. 20, 2004

(87) PCT Pub. No.: WO03/031178

PCT Pub. Date: Apr. 17, 2003

(65) Prior Publication Data

US 2005/0104259 A1    May 19, 2005

(30) Foreign Application Priority Data

Oct. 11, 2001   (AU) .................................... PR8214

(51) Int. Cl.
*B29C 70/00*   (2006.01)
(52) U.S. Cl. ........................ 264/511; 264/571
(58) Field of Classification Search .......... 264/511, 264/571
See application file for complete search history.

(56) References Cited

U.S. PATENT DOCUMENTS 5,403,537 A * 4/1995 Seal et al. ................. 264/511
6,203,749 B1 * 3/2001 Loving ...................... 264/510

FOREIGN PATENT DOCUMENTS

WO   WO 01/92001 A1   12/2001

* cited by examiner

*Primary Examiner*—Suzanne E. McDowell
(74) *Attorney, Agent, or Firm*—David A. Farah; Sheldon Mak Rose & Anderson PC (57) ABSTRACT

A method of manufacturing a composite sandwich structure, the method comprising a preform assembly method. The method comprises providing a preform (8) comprising at least two sheets (12, 14) connected by a plurality of extensible threads (16), and affixing to the outer face of each sheet (12, 14), a face sheet (18, 22). The adhesion is by a film adhesive (20, 24) placed over the respective sheets (12, 14), and the preform (8) is subjected to pressure or heat to set the film adhesive (20, 24). The method further comprises a method of molding a composite sandwich structure, the method comprising placing a preform (8) in a mold (30), creating pressure differentials between respective chambers (40, 42) within the mold (30), feeding a resinous compound into the mold (30), and allowing the resinous compound to set and cure. The invention also provides composite sandwich structures made in accordance with the methods.

33 Claims, 4 Drawing Sheets

METHOD OF MANUFACTURING COMPOSITE SANDWICH STRUCTURES

CROSS-REFERENCE TO RELATED APPLICATION

This application is a 371 filing of International Patent Application PCT/AU02/01383, entitled "Method of Manufacturing Composite Sandwich Structures," filed Oct. 11, 2002, which claims priority from Australian Patent Application PR 8214, filed Oct. 11, 2001, the contents of which are incorporated by reference herein in their entirety.

BACKGROUND

Three-dimensional textiles for sandwich structures are known. Such textiles have two sheets connected by a plurality of extensible threads. During manufacturing, the extensible threads and the inner surfaces of the sheets are coated with a resin. The sheets are then moved apart by the required distance so that the extensible threads extend generally perpendicularly to both sheets. The resin is then allowed to cure, thereby creating a sandwich structure of relatively high stiffness yet being relatively light weight. Additional load carrying capacity, hence usefulness, may be added to this sandwich structure by adhering face sheets to the outer face of each sheet in a secondary process, the adhesion generally being achieved by the use of film adhesives, normally a thermoset adhesive.

Difficulty has been experienced in achieving reasonable perpendicularity of the extensible threads and ensuring flat face sheets. The known processes for achieving this are slow and relatively complex, thus making the composite sandwich structure so produced relatively expensive. It also means the process is quite slow, making it difficult for mass production.

Furthermore, the known manufacturing techniques are not suitable for large or complex shapes, thereby restricting their use.

It is therefore an object of the present invention to provide a method of manufacturing composite sandwich structures which at least in part addresses the problems of the known methods.

A further object is to produce a composite sandwich structure from the new method.

SUMMARY

With the above and other objects in mind, the present invention provides a method of manufacturing a composite sandwich structure using a basic preform as its basis, this preform comprising at least two sheets connected by a plurality of extensible threads. The method consists of two stages.

The first stage, known as the preform assembly method, is a technique to create the preform stacking sequence, and incorporate a bond between individual layers in this stacking sequence sufficient to withstand the loads and chemicals applied during molding, and during the design life of the created structure. A permanent bond is applied between layers incorporated in the final structure. A non-permanent bond is employed between outer face sheets of the final structure and caul plates (if used) or diaphragm, and between the caul plates (if used) and diaphragm.

The preform assembly method involves affixing to the outer face of a first sheet and/or second sheet a face sheet, the adhesion being by a film adhesive placed over at least substantially all of each outer surface, and subjecting the preform to pressure and/or heat to set the film adhesive.

Preferably, the film adhesive is one or more of a thermoplastic or thermoset material, a non-porous film, a net- or grid-like open structure, and/or a random filament. The film adhesive may create a permanent or non-permanent bond and will not react with the resin used to impregnate the preform.

The face sheet may be of any suitable material, and the material of the first face sheet may be different to that of the second face sheet. These variations of these suitable materials may include unimpregnated fabric(s) to be impregnated in-situ with the three-dimensional fabric, or hardened skin(s) such as metals of previously cured composite materials, etc., or caul plate(s) used to give dimensional stability and quality finish to the final molding. Also, no additional face sheets may be incorporated.

The present invention also includes a composite sandwich structure preform produced by the above method.

The present invention also provides a second stage in the method of manufacturing a composite sandwich structure, which is a molding method. During the description of this second stage, all sheets assembled against the first sheet during the preform assembly method will be collectively referred to as the first sheet. Likewise, all sheets assembled against the second sheet during the preform assembly method will be collectively referred to as the second sheet.

The molding method includes the steps of:
(a) placing a preform (which may or may not be in accordance with the earlier described method) in a mold, the preform comprising a first sheet and a second sheet, there being a plurality of extensible threads extending between the first sheet and second sheet, the mold comprising a first portion and a second portion, the first sheet being in the first portion, and the second sheet being in the second portion;
(b) placing a diaphragm between the first sheet and the first portion of the mold, the diaphragm extending to at least an outer periphery of the first portion, there being a first chamber between the diaphragm and the first portion, and a second chamber between the diaphragm and the second portion;
(c) non-permanently adhering to the first sheet of the preform to the diaphragm and non-permanently adhering the second sheet to the second mold portion;
(d) creating a pressure differential between the second chamber and the first chamber by reducing the pressure in the second chamber;
(e) using the pressure differential to feed a resinous compound into the second chamber to coat the extensible threads and surfaces of the first sheet and second sheet capable of being infused;
(f) ceasing the feeding of the resinous compound into the second chamber;
(g) ceasing the reduction of the pressure in the second chamber to substantially equalize the pressures in the first and second chambers;
(h) creating a second pressure differential between the second chamber and the first chamber by comprising the pressure in the first chamber below that in the second chamber to thus cause the diaphragm and hence, the first sheet to move away from the second sheet thereby causing the extensible threads to extend;
(i) maintaining the second pressure differential; and
(j) allowing the resinous compound to set and cure.

Preferably, the second pressure differential at step (h) is created by applying sufficient vacuum pressure to the first chamber. Alternatively, or additionally, it may be created by applying a positive pressure in the second chamber. More preferably, the vacuum pressure is created by a first vacuum source.

Preferably, the first chamber is vented during step (d), the venting ceasing upon the commencement of step (h).

More preferably, the second chamber is vented during step (h). This venting may be slow, or rapid.

Advantageously, the reduction of the pressure in step (d) is by means of the application of the vacuum source, preferably to a second vacuum port in the second portion of the mold. Alternatively, a second vacuum source may be used. More preferably the feeding of the resinous compound is by at least one inlet port in the second portion. Alternatively, the at least one inlet port may be between the first and second portions.

More advantageously, the vacuum port is located at or adjacent to the center of the second portion; the at least one inlet port being located outside the periphery of the preform.

Preferably, the vacuum source is connected to the vacuum port as well as the first chamber by separate tubes, the separate tubes being separately openable and closable by appropriate devices such as, for example, clamps, valves, or the like. Alternatively, the inlet port may be at a first end of the second portion and the vacuum port at a second end of the second portion, the preform assembly being located between the first end and the second end.

More preferably, the connection to the first chamber is by means of a first vacuum port in the first portion. Advantageously, the first vacuum port is also substantially centrally located.

Advantageously, heat is applied for a predetermined time during step (j). Preferably, the heat is applied by heating the first portion and/or the second portion. Alternatively, the heat is applied by introducing heated air into the second chamber. The heated air may be introduced through the at least one inlet port and/or the second vacuum port and/or a further inlet part. Further alternatively, the heat may be applied by placing the mold in a heated oven.

The first sheet, second sheet and extensible threads form a three-dimensional fabric, which may be of any suitable material such as, for example, glass fibre, carbon fibre, or any other suitable textile material.

Preferably, a caul plate is releasably adhered to the diaphragm above the first sheet, and to the preform.

The resinous compound may be fed using a positive pressure. A carrier mesh may be used. If a carrier mesh is used it is preferably attached to the inlet ports and carries the resinous compound to the preform.

The resinous compound may be of any suitable type such as, for example, a vinylester, phenolin, epoxy, or the like, resin. A carrier may be used, if desired.

The diaphragm may also extend around the preform, in the form of a bag. In that instance, the vacuum inlet and/or outlet ports may pass through the bag.

The mold may be any mold which is capable of incorporating a diaphragm and of holding vacuum in a cavity under the diaphragm sufficient to conduct a successful infusion of the preform assembly. This includes a sealed, fully closed mold, a base plate-diaphragm combination, an envelope bag, or any other suitable means.

The mold preferably incorporates the means for the infusion of the preform assembly with resin.

The mold advantageously includes means for creating a pressure differential on either side of the diaphragm and is capable of maintaining the pressure differential until the sandwich structure is cured.

The mold preferably includes means for supporting the predetermined, final component dimensions. This may include:
 caul plate(s) in the internal cavity (usually limited in separation distances by an external system);
 shaped mold(s) external to the diaphragm; and/or
 in the case of hardened face sheet(s), an external system to limit the extension between said face sheet(s).

Alternatively, the cavity dimensions of the mold (between the first and second portion) may be mechanically controlled and varied by the use of mechanical devices such as actuators. In this way the first and/or second portions may be relatively moveable to cause the separation of the first sheet and second sheet and thus the extension of the extensible threads. This feature may also be used to control cavity dimensions at the resin injection stage (e). This may result in the non-use of the diaphragm.

FIGURES

In order that the invention may be fully understood, there shall now be described, by way of non-limiting example only, preferred embodiments of the present invention, with reference to the accompanying illustrative drawings in which.

DESCRIPTION

As used in this disclosure, reference to a vacuum source is to be taken to include a source of suction, and includes a suction or vacuum source or sources, or any other source of suction or vacuum.

Figure 1:
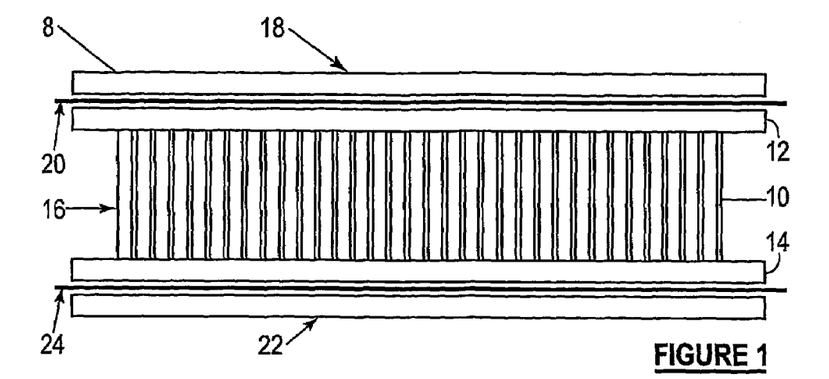
FIG. 1 is a schematic side view of a typical preform.

To refer to the drawings, FIG. 1 shows a typical preform assembly 8 created by the Preform Assembly Method (PAM) comprising a distance fabric 10 which has a first sheet 12 and second sheet 14 comprising extensible threads 16 extending therebetween. A first face sheet 18 is attached to first sheet 12 by a first thermoadhesive film 20; and a second face sheet 22 is attached to a second sheet 14 by a second thermoadhesive film 24.

The attachment of the face sheets 18 and 22 to the distance fabric 10 occurs during PAM. The PAM process depends strictly on the requirements of the adhesive film used to attach the adjacent sheets. The process to be described is for the adhering of the face sheets 18 and 22 to the distance fabric 10 using two thermoplastic adhesive films 20 and 24 requiring heat and pressure for correct application.

Figure 2:
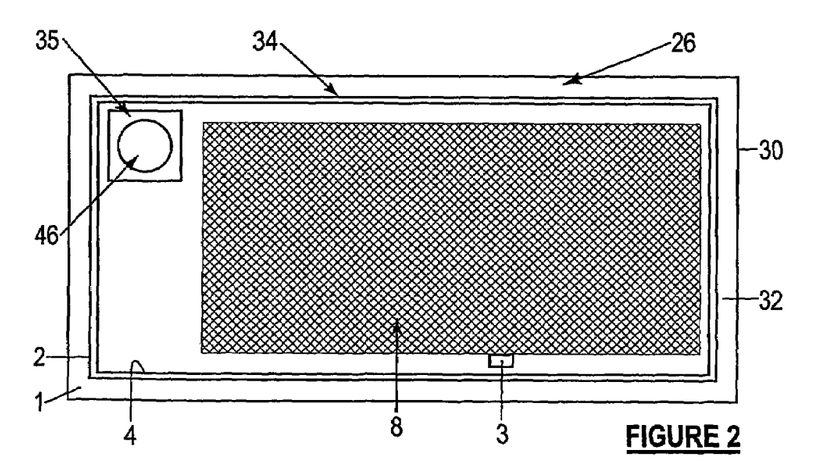
FIG. 2 is a schematic plan view of the preform assembly of FIG. 1 during the preform assembly method.

FIG. 2 shows the preform 8 in place on a flat base plate 1. Over the plate is placed a vacuum diaphragm 2. This diaphragm 2 extends beyond the perimeter of the flat base plate 1. Under the diaphragm 2 is placed a vacuum port 36, breather material 35, and thermocouple schematically shown as 3, the thermocouple being to measure the temperature of the adhesive films 20 and 24. The diaphragm 2 is sealed against the base plate 1 using a sealing bead 4 of mastic. The assembly is then placed in an oven. A vacuum source is applied to the vacuum port 36 to give an appropriate consolidation pressure for the adhesive films 20 and 24. The oven heats the adhesive films to the appropriate bonding temperature. Alternatively, heated pressure rollers and/or a heated press (with or without pressure) may be used. When the appropriate temperature is shown by the thermocouple 3, the temperature is maintained for the recommended bond time for the adhesive film. The base plate 1 and preform assembly 8 are then removed from the oven and allowed to cool. Upon cooling, the preform is removed from the base plate 1 and checked for good adhesive film bonding. If the bond is adequate, the preform 8 is ready for infusion.

During the following description, all sheets assembled against the first sheet 12 during the preform assembly method will collectively be called the first sheet 12, and all sheets assembled against the second sheet 14 during the preform assembly method will collectively be called the second sheet 14.

Figure 4:
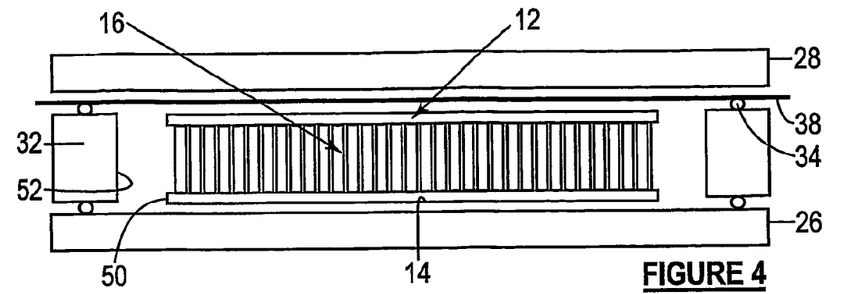
FIG. 4 is a schematic side view of the preform at full height within the mold.
Figure 5:
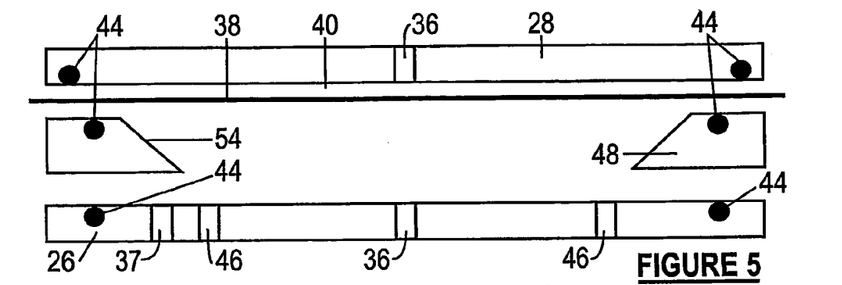
FIG. 5 is a schematic side view of the mold prior to insertion of preform.
Figure 6:
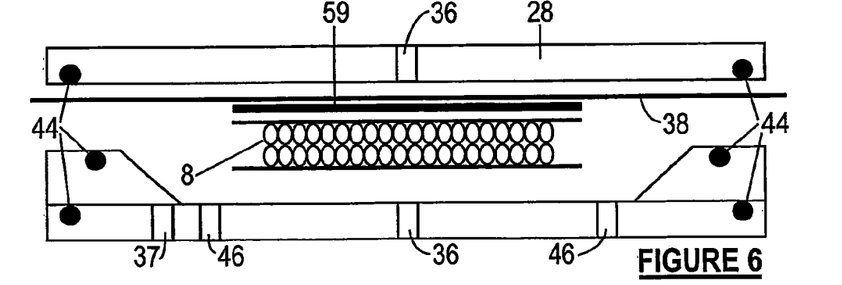
FIG. 6 is a schematic side view corresponding to FIG. 5 after insertion of the preform.
Figure 7:
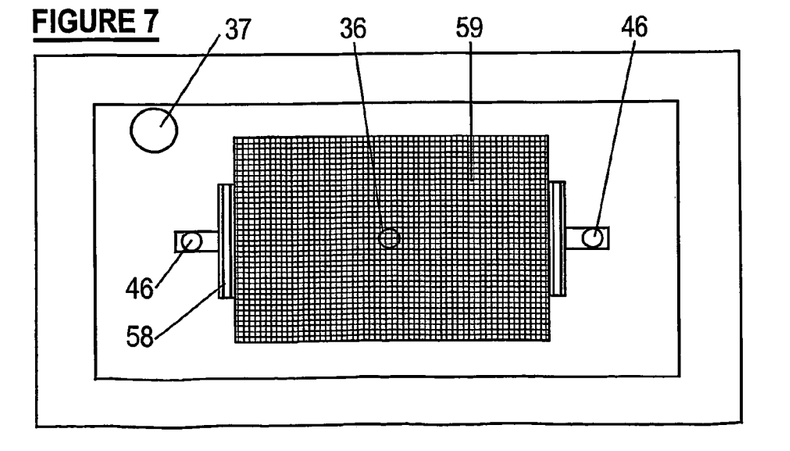
FIG. 7 is a top view corresponding to FIG. 6.

The preform 8 is located in a second portion 26 of a mold generally designated as 30, which also has a first portion 28 (FIG. 4). The second portion 26 has a peripheral frame 32, to which is applied a sealing bead 34. Between first face sheet 18 and first portion 28 there is located a diaphragm 38, which extends to and beyond plate 32 and over the sealing bead 34. The first face sheet 18 is temporarily bonded to the diaphragm 38. As is shown in FIGS. 5 and 6, rather than peripheral frame 32 there may be provided a tapered frame 48 around the periphery of second portion 26 to aid the deformation of the diaphragm 38. Both frame 32 and frame 48 assist to create a first chamber 40 between diaphragm 38 and first portion 28, and a second chamber 42 between diaphragm 38 and second potion 26. Seals 44 may be provided in addition to, or in place of, sealing bead 34.

Both first portion 28 and second portion 26 have a vacuum ports 36 which, as shown in FIG. 5, may be centrally located in the relevant portions 26, 28. Resin inlet ports 46 are provided in second portion 26, although they may be in frame 48, if desired. The resin inlet ports 46 are preferably located between the periphery 50 of preform 8, and the inner edge 52 of frame 32, or inner edge 54 of tapered frame 48. As will be realized from the above description, the frame 48 is used when the frame 32 is not used, and vice versa.

Figure 3:
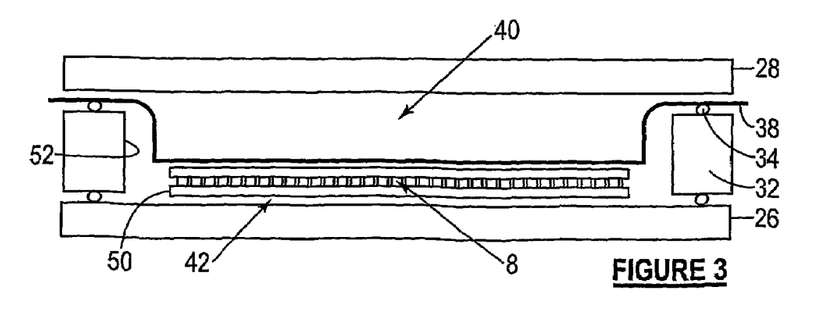
FIG. 3 is a schematic side view of the preform under vacuum prior to infusion.

Therefore, upon first portion 28 engaging with second portion 26, diaphragm 38 seals on sealing bead 34 and is secured between the peripheries of the first and second portions 26, 28. Suction (vacuum) is then applied to vacuum port 36 in second portion 26, so that the preform 8 will be securely drawn into second portion 26, as will be the attached diaphragm 38 (FIG. 3). With an appropriate resinous compound (not shown) being fed into second chamber 42, the reduced pressure in second chamber 42 will draw the resinous compound into and through the chamber 42 and the preform 8. The resinous compound may have a positive pressure applied to it, if desired. If a positive pressure is used, a higher positive pressure must be applied in the first chamber 40 to restrict the diaphragm 38 from rising. As diaphragm 38 presses on first face sheet 12, and as second face sheet 14 presses on second portion 26, the resinous compound is drawn through the preform 8 and thereby coats the infusible surfaces of those sheets, as well as the extensible threads 16 extending therebetween. Any surplus resinous compound will exit through vacuum port 36, where it can be recovered in an appropriate trap.

The feed of the resinous compound continues until all threads 16 and the infusible surfaces of first sheet 12 and second sheet 14 are coated. This time will depend on the nature of the resinous compound, the sheets 12, 14 the number and size of threads 16, and the size of the preform 8.

When the resinous compound has fully infused the preform 8, the resin inlet ports 46 are closed and the vacuum port 36 in second portion 26 is closed. The suction (vacuum) is then applied to vacuum port 36 in first portion 28. The second chamber 42 is simultaneously or earlier vented to the atmosphere by the vent port 37, and/or by resin inlet ports 46, so that second chamber 42 returns to atmospheric pressure. The vent port 37 may, if desired, be through frame 48. Alternatively, a positive pressure can be applied to second chamber 42 so that the first chamber 40 is at a relatively lower pressure. By virtue of the vacuum applied to vacuum port 36 in first portion 28, first chamber 40 is of reduced pressure. This therefore creates a pressure differential between first chamber 40 (low pressure) and second chamber 42 (higher pressure), causing diaphragm 38 to be drawn towards first portion 28, thus drawing first sheet 12 upwardly and away from second sheet 14 which is non-permanently adhered to the second mold portion 26 so that it will not move relative thereto during the molding process. Therefore, the extensible threads 16 are extended. The distance between the first and second face sheets 12, 14 is that which is desired, as set by the mold cavity height (the sum of the heights first chamber 40 and second chamber 42). This height is usually predetermined by the height of frame 32 or frame 48. Hence, due to the pressure differential the diaphragm 38 and first sheet 12 are drawn up to the first mold portion. The suction (vacuum) is maintained in the vacuum port 36 in first portion 38, and second chamber 42 is sealed to allow the resinous compound to set and cure.

Alternatively, self-foaming resins can be used to infuse the preform. In this case, the pressure differential between the second chamber 42 and the first chamber 40 is created by the foaming of the resin. In this case, after the resinous compound has fully infused the preform 8, the resin inlet ports 46 are closed and the vacuum port 36 in second portion 26 is closed. The second chamber 42 is then vented to the atmosphere by the vent port 37 and/or by resin inlet ports 46, so that the second chamber 42 returns to atmospheric pressure. The first chamber 40 remains at atmospheric pressure. The foaming reaction of the resin, initiated chemically or by the application of heat, creates the pressure differential between the first chamber 40 (low pressure) and the second chamber 42 (high pressure), causing diaphragm 38 to be drawn towards the first portion 28. Thus, the first sheet 12 is drawn upwardly and away from the second sheet 14. The distance between the first and second face sheets 12, 14 is that which is desired, as set by the mold cavity height. The penetration of the first sheet 12 by the foaming resin is resisted by the bonding of the impermeable diaphragm 38 directly on the first sheet 12 during preform assembly. The penetration of the second sheet 14 is similarly resisted by the bonding of the impermeable second portion 26 directly onto the second sheet 14. When an appropriately engineered foaming resinous compound is used, an excellent quality infusion and finish in the skin in combination with a quality foam core will result. When using this type of foaming resin to create a sandwich structure, the distance fabric 10 may or may not be left out of the preform assembly 8 and, hence, the resulting sandwich structure. In the case of the distance fabric 10 being left out of the preform 8, the first sheet 12 is bonded to the diaphragm 38 and the second sheet 14 is bonded to the second portion 26, but they are not bonded to each other. This allows for their separation during the foaming of the resin. Maximum separation distance is again set by the mold cavity.

If desired, the mold 30 may be heated to assist the setting and curing of the resinous compound. Heating may be by heating elements being placed in mold 30, or by placing mold 30 in an oven. Alternatively, hot air could be introduced to second chamber 42 through resin inlet ports 46 and/or venting port 37 in second portion 26.

Upon setting, and preferably curing, of the resinous compound, the mold 30 is separated, diaphragm 38 removed, and the expanded composite structure removed.

Figure 8:
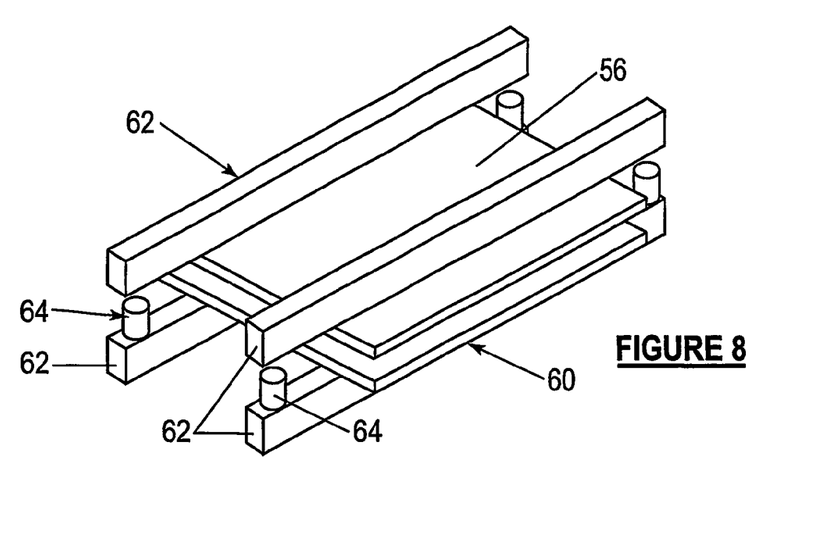
FIG. 8 is a schematic view of components of the external molding assembly used with the embodiment of FIG. 11.
Figure 9:
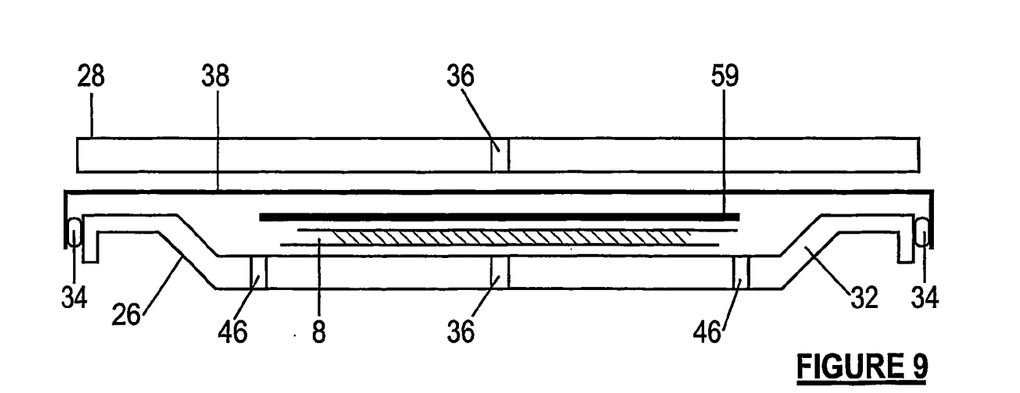
FIG. 9 is a schematic side view showing an alternative mold design.
Figure 10:
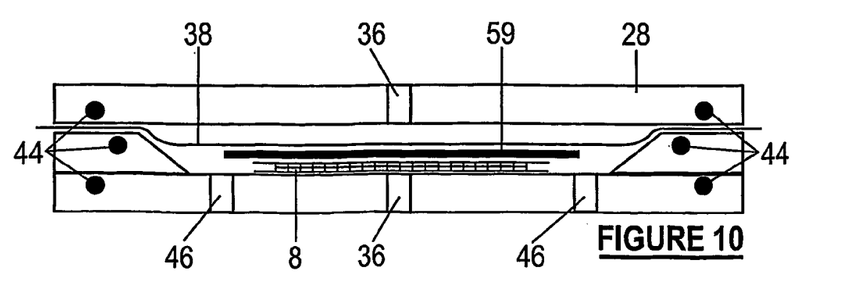
FIG. 10 is a schematic side view prior to infusion.
Figure 11:
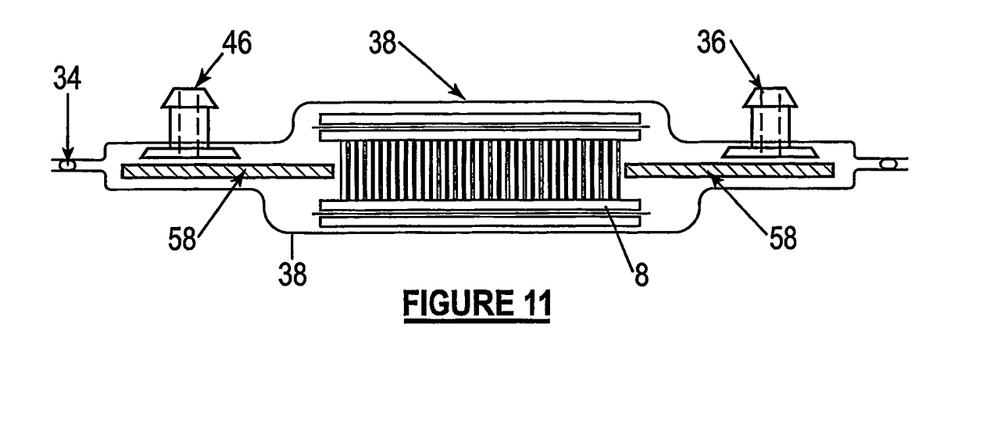
FIG. 11 is a schematic side view of a second embodiment.
Figure 12:
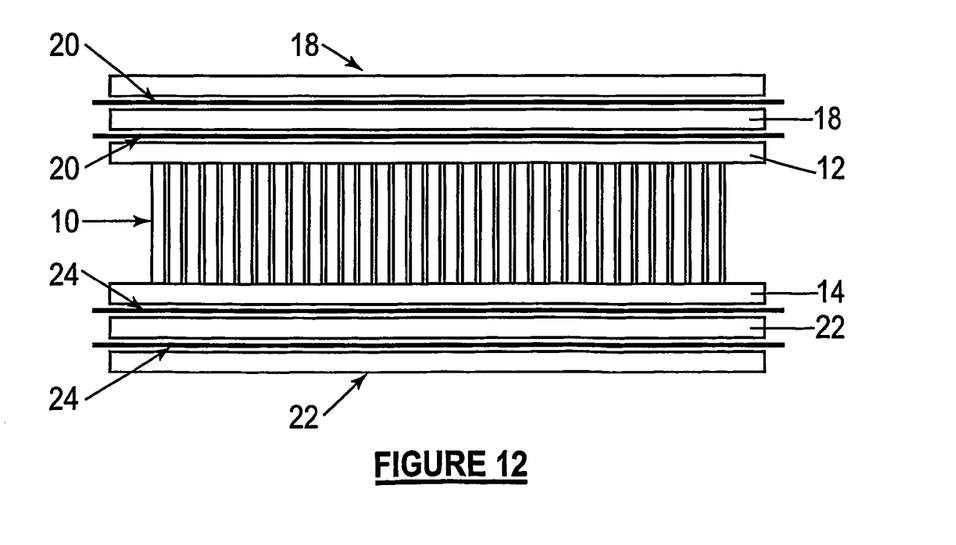
FIG. 12 is a schematic side view of an alternative preform

If desired, external caul plates 56 and 60 (FIG. 8) may be used, particularly for the embodiment of FIG. 11. For the embodiment of FIG. 11 clamping bars 62, spaced apart by spacer elements 64, are used to support the separation of the external caul plates 56 and 60, which in turn give the desired final dimensions of the preform 8 during the later stages of the infusion process and during curing processes. The vacuum ports 36 and/or inlet ports 46 and/or vent port 37 may be beyond the periphery of the preform 8, if desired. However, the vacuum port 36 and inlet ports 46 should not be adjacent.

The diaphragm 38 is preferably a non-porous film capable of holding a vacuum of the order of 100 kPa. It may be elastic or semi-elastic. Examples of suitable materials include silicon rubber sheet, latex rubber sheet, and a nylon bagging film, etc. As the resinous compound may contaminate the diaphragm 38 during infusion and/or expansion of the preform 8, the diaphragm 38 and the resinous compound should be such that there is no chemical interaction between them.

If desired, a caul plate 59 may be used (FIG. 6). The caul plate 59 is placed between the first sheet 12 and the diaphragm 38 to aid control, and/or to improve the surface quality of first sheet 12. In addition, the use of caul plate 59 may assist in reducing peeling-off effects as the diaphragm 38 may initially stretch over the entire area of the caul plate 59. Furthermore, the caul plate 59 may slightly enhance the infusion of the resinous compound as improved flow paths may result. The caul plate 59 is preferably at least as large as the preform 8 and may, if desired, be releasably or securely attached to the diaphragm 38 or first sheet 12 by, for example, double-sided tape. The attachment to the caul plate 59 may also occur during preform assembly method.

Furthermore, a carrier mesh 58 may also be used to assist the resinous compound to pass from the inlet ports 46 to the preform 8. The carrier mesh 58 is attached to the interior of second portion 26 at or adjacent the inlet ports 46 and extends to and along the side edges of preform 8. The carrier mesh 58 may extend totally or partially around the periphery of preform 8.

EXAMPLE

One example of the production of a composite sandwich structure in accordance with an embodiment of the present invention is described below.

Preform Assembly Method

The surface of plate 1 is cleaned with acetone, with the surface being flat and free of debris and lumps.

A single layer of non-perforated adhesive film is cut to dimensions identical to the preform 8. This layer 20 is to provide a bond between the outer preform surface 18 and the bagging film 38. Layers of perforated adhesive film 20 are cut to provide a bonding/interleaf layer between all preform-to-preform surfaces.

The lower preform surface 22 is placed on plate 1. Alternate layers of perforated adhesive film 20 and preform fabrics are then placed above lower sheet 22 as required. A layer of the perforated adhesive 20 is placed on all preform-to-preform surfaces to bond the preform surfaces and also allow resin to move between the surfaces. A layer of non-perforated adhesive film is placed on top of preform 8.

Mastic tape or other similar sealant is applied to the tooling plate, outside of the perimeter of the preform 8. A thermocouple 3 is placed on the edge of the preform 8, such that it is contacting the adhesive film 20.

The vacuum source fittings are connected to the vacuum port 36 in plate 1. A full vacuum (~100 kPa) is applied to enable checks of vacuum leaks.

The oven is preheated to the required temperature for adhesive bonding (or just above bonding temperature), and the vacuum is set to the bonding pressure. The plate 1 with preform 8 is placed in the oven and heated until the thermocouple 3 shows that the thermoadhesive film 20, 24 has reached its/their bonding temperature. The temperature is held for the appropriate time.

The plate 1 and preform 8 are removed from the oven and allowed to cool. The vacuum fittings and thermocouple 3 are removed. The bagging/preform is removed from the plate 1 without peeling the bag from the preform 8. The excess bag/preform is removed to give a net-shape preform with bagging on the skins.

Liquid Molding Preparation

All mold surfaces (inside of mold, caul plate) are cleaned with acetone, with there being no remains of resin flash on mold surfaces and resin inlet channels.

All required hoses are fastened to the appropriate ports in the mold by using compression fittings.

Assembly

Strips of double-sided tape are applied to the edges of both sides of the preform 8 and the caul plate 59. The preform 8 is fixed to the caul plate 59 using this tape. The preform 8 is placed in the center of the second portion 26 of the mold and pressed to achieve a proper bond. The carrier mesh 58 is attached to both inlet ports 46. Mastic tape is applied to the outside of the mold, using extra strips to seal the corners. The diaphragm 38 is fixed to the mold plate, hence, sealing the mold.

Process Set-up

The vacuum and the first venting hose are connected to a resin trap to catch any excess resin. The vacuum source is then attached to the resin trap lid and the resin inlet and the venting hoses are clamped. The lid is closed and securing bars placed in position, and fastening bolts gently tightened. Full vacuum is applied for infusion.

Liquid Molding Procedure

An appropriate amount of resin is mixed for a predetermined gel time. The two resin inlet hose(s) are inserted into the cup. The infusion time is recorded. At the first sign of resin in the exit line, the vacuum pressure is reduced to 40 kPa for 3 minutes. The resin inlet lines and exit line are then closed. A full vacuum is then applied to the resin trap, and, after connecting in the vacuum line of the lid directly to the vacuum, full vacuum is applied. The venting hoses are opened and the vacuum in the resin trap reduced to zero at a rate of 2 kPa/sec. The resin lines are removed, and the resin cup and excess hoses also removed. After approximately 2 hours the first venting hose is closed and 5 kPa vacuum applied to the first venting hose. This ventilates the mold and accelerates the curing by replacing the styrene. Curing for several hours is allowed. The clamps are then removed and excess lines cut. The clamping bars are removed from the tool and the lid opened. The diaphragm is removed and the tooling plate released from the expanded structure. The expanded structure is removed from the mold.

Although the present invention has been discussed in considerable detail with reference to certain preferred embodiments, other embodiments are possible. Therefore, the scope of the appended claims should not be limited to the description of preferred embodiments contained in this disclosure. All references cited herein are incorporated by reference to their entirety.

The invention claimed is:

1. A method of molding a composite sandwich structure, the method comprising:
    (a) placing a preform in a mold, where the preform comprises a first sheet and a second sheet and a plurality of extensible threads extending between the first sheet and second sheet, where the mold comprises a first portion and a second portion, and where the first sheet is in the first portion and the second sheet is in the second portion;
    (b) placing a diaphragm between the first sheet and the first portion of the mold, where the diaphragm extends to at least an outer periphery of the first portion, and where there is a first chamber between the diaphragm and the first portion and a second chamber between the diaphragm and the second portion;
    (c) non-permanently adhering the first sheet of the preform to the diaphragm and non-permanently adhering the second sheet to the second mold portion;
    (d) creating a pressure differential between the second chamber and the first chamber by reducing the pressure in the second chamber;
    (e) using the pressure differential to feed a resinous compound into the second chamber to coat the extensible threads and surfaces of the first sheet and second sheet capable of being infused;
    (f) ceasing the feeding of the resinous compound into the second chamber;
    (g) ceasing the reduction of the pressure in the second chamber to substantially equalize the pressures in the first and second chambers;
    (h) creating a second pressure differential between the second chamber and the first chamber by comprising the pressure in the first chamber below that in the second chamber, thereby causing the diaphragm and, hence, the first sheet, to move away from the second sheet, thereby causing the extensible threads to extend;
    (i) maintaining the second pressure differential; and
    (j) allowing the resinous compound to set and cure.

2. A method according to claim 1, where the second pressure differential at step (h) is created by applying a vacuum pressure to the first chamber.

3. A method according to claim 2, where the vacuum pressure is created by a first vacuum source.

4. A method according to claim 2, where vacuum pressure is applied to the first chamber by a first vacuum port in the first portion.

5. A method according to claim 4, where the first vacuum port is substantially centrally located in the first portion.

6. A method according to claim 1, where the second pressure differential is created by applying a positive pressure in the second chamber.

7. A method according to claim 1, where the first chamber is vented during step (d), and where the venting ceases upon the commencement of step (h).

8. A method according to claim 7, where the second chamber is vented during step (h).

9. A method according to claim 7, where reducing the pressure in step (d) comprises applying the first vacuum source.

10. A method according to claim 9, where the first vacuum source is applied to a second vacuum port in the second portion of the mold.

11. A method according to claim 10, where the second vacuum port is located at or adjacent to the center of the second portion; and
    where the at least one inlet port is located outside the periphery of the preform.

12. A method according to claim 11, where the first vacuum or second vacuum source is connected to the second vacuum port and to the first chamber by separate tubes; and
    where the separate tubes are separately openable and closable.

13. A method according to claim 10, where the inlet port is at a first end of the second portion and the second vacuum port at a second end of the second portion; and
    where the preform assembly is located between the first end and the second end.

14. A method according to claim 9, where a second vacuum source is applied to a second vacuum port in the second portion of the mold.

15. A method according to claim 14, where the second vacuum port is located at or adjacent to the center of the second portion; and
    where the at least one inlet port is located outside the periphery of the preform.

16. A method according to claim 15, where the first vacuum or second vacuum source is connected to the second vacuum port and to the first chamber by separate tubes; and
    where the separate tubes are separately openable and closable.

17. A method according to claim 14, where the inlet port is at a first end of the second portion and the second vacuum port at a second end of the second portion; and
    where the preform assembly is located between the first end and the second end.

18. A method according to claim 1, where the resinous compound is fed by at least one inlet port in the second portion.

19. A method according to claim 1, where the resinous compound is fed by at least one inlet port located between the first and second portions.

20. A method according to claims 1, where heat is applied for a predetermined time during step (j).

21. A method according to claim 20, where the heat is applied by heating the first portion or the second portion, or both the first portion and the second portion.

22. A method according to claim 20, where the heat is applied by introducing heated air into the second chamber.

23. A method according to claim 22, where the heated air is introduced through the at least one inlet port or the second vacuum port or a further inlet port or a combination of the preceding.

24. A method according to claim 20, where the heat is applied by placing the mold in a heated oven.

25. A method according to claim 1, where a caul plate is releasably adhered to the diaphragm above the first sheet, and to the preform.

26. A method according to claim 1, where the resinous compound is fed using a positive pressure in step (e).

27. A method according to claim 1, where a carrier mesh is used to feed the resinous compound in step (e); and
where the carrier mesh is attached to the inlet ports.

28. A method according to claim 1, where the resinous compound is selected from the group consisting of a vinylester, a phenolin, an epoxy and a resin.

29. A method according to claim 1, where the mold is capable of incorporating a diaphragm and of holding vacuum in a cavity under the diaphragm sufficient to conduct a successful infusion of the preform assembly.

30. A method according to claim 29, where the mold is selected from the group consisting of a sealed, fully closed mold, a base plate-diaphragm combination or an envelope bag.

31. A method according to claim 29, where the mold incorporates means for the infusion of the preform assembly with resin.

32. A method according to claim 29, where the mold comprises means for creating a pressure differential on either side of the diaphragm and is capable of maintaining the pressure differential until the sandwich structure is cured.

33. A method according to claim 29, where the mold comprises means for supporting the predetermined, final component dimensions.

* * * * *